(12) United States Patent
Wygonik et al.

(10) Patent No.: US 10,642,453 B2
(45) Date of Patent: May 5, 2020

(54) NAVIGATIONAL AID FOR A HINGED DEVICE VIA SEMANTIC ABSTRACTION

(71) Applicant: Microsoft Technology Licensing, LLC, Redmond, WA (US)

(72) Inventors: Gregg Robert Wygonik, Duvall, WA (US); Raymond Quan, Shoreline, WA (US); Christian Klein, Duvall, WA (US)

(73) Assignee: Microsoft Technology Licensing, LLC, Redmond, CA (US)

( * ) Notice: Subject to any disclaimer, the term of this patent is extended or adjusted under 35 U.S.C. 154(b) by 0 days.

(21) Appl. No.: 16/373,772

(22) Filed: Apr. 3, 2019

(65) Prior Publication Data

US 2019/0227682 A1    Jul. 25, 2019

Related U.S. Application Data

(63) Continuation of application No. 15/419,287, filed on Jan. 30, 2017, now Pat. No. 10,296,176.

(51) Int. Cl.

| | | |
|---|---|---|
| *G06F 3/0483* | (2013.01) | |
| *G06F 3/0488* | (2013.01) | |
| *G06F 3/0485* | (2013.01) | |
| *G06F 1/16* | (2006.01) | |
| *G06F 17/21* | (2006.01) | |
| *G06F 17/27* | (2006.01) | |

(Continued)

(52) U.S. Cl.
CPC .......... *G06F 3/0483* (2013.01); *G06F 1/1616* (2013.01); *G06F 1/1641* (2013.01); *G06F 1/1677* (2013.01); *G06F 1/1681* (2013.01); *G06F 3/0485* (2013.01); *G06F 3/0488* (2013.01); *G06F 17/217* (2013.01); *G06F 17/2785* (2013.01); *G06F 3/0482* (2013.01); *G06F 17/245* (2013.01)

(58) Field of Classification Search
CPC .... G06F 3/0483; G06F 3/0485; G06F 3/0488; G06F 1/1616; G06F 1/1641; G06F 1/1677; G06F 1/1681; G06F 17/217; G06F 17/2785
See application file for complete search history.

(56) References Cited

U.S. PATENT DOCUMENTS 9,324,303 B2 *   4/2016   Ma ........................... G09G 5/37
9,471,203 B1 *   10/2016   O'Dell, III .......... G06F 16/4393
(Continued)

*Primary Examiner* — Sardis F Azongha

(57) ABSTRACT

Techniques for navigational aid for a hinged device via semantic abstraction are described. Generally, the techniques described herein improve a user experience when the user is navigating through content, such as user-generated content in an electronic document. For example, the techniques described herein semantically abstract authored content in an electronic document to provide abstracted content. In implementations, abstracted content includes abstracted pages that each represent a different section of the authored content. When a user scans through an electronic document, rather than scanning page by page, techniques described herein instead navigate through displays of the abstracted pages. In addition, a hinge between different displays can be used as an input mechanism to control a speed of navigating through the abstracted pages to allow a user to more easily locate specific sections of the authored content.

20 Claims, 8 Drawing Sheets

(51) Int. Cl.
*G06F 17/24* (2006.01)
*G06F 3/0482* (2013.01)

(56) References Cited

U.S. PATENT DOCUMENTS

| | | | | |
|---|---|---|---|---|
| 2007/0085845 | A1* | 4/2007 | Kikuchi | G06F 3/0412 |
| | | | | 345/204 |
| 2011/0248967 | A1* | 10/2011 | Wang | G09G 3/344 |
| | | | | 345/204 |
| 2014/0320393 | A1* | 10/2014 | Modarres | G06F 3/017 |
| | | | | 345/156 |
| 2015/0227308 | A1* | 8/2015 | Kim | G06F 3/0486 |
| | | | | 715/769 |
| 2016/0062485 | A1* | 3/2016 | Kondo | G09G 5/00 |
| | | | | 345/156 |
| 2017/0344120 | A1* | 11/2017 | Zuniga | G06F 1/1649 |

* cited by examiner

NAVIGATIONAL AID FOR A HINGED DEVICE VIA SEMANTIC ABSTRACTION

CROSS REFERENCE TO RELATED PATENT APPLICATIONS

This application is a continuation of and claims priority to U.S. Non-Provisional patent application Ser. No. 15/419,287, entitled "NAVIGATIONAL AID FOR A HINGED DEVICE VIA SEMANTIC ABSTRACTION", filed on Jan. 30, 2017, which is hereby incorporated by reference herein, in its entirety.

BACKGROUND

Mobile devices provide today's user with a variety of different functionalities, and in many instances allow the user to directly interact with objects displayed via touch-sensitive display devices. Devices having multiple display surfaces connected by a hinge, however, introduce complexities that are typically not resolved using conventional gesture input modalities. Such a device can include two portions of the device that each include a display screen and which are connected by a physical hinge that can be manipulated by the user. In the context of a book or journal, for example, a user can view two pages in a way that resembles a paper book or a note book.

In an example, the user can use the hinged device to generate content, such as notes, journal entries, documents, and so on. Some users can generate volumes of content, such as by creating daily journal entries over many years. Some users may not organize their created content, and thus finding specific content within their created content can be challenging and time consuming. This can detract from user enjoyment and lead to user frustration when using these types of devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for navigational aid for a hinged device via semantic abstraction are described. Generally, the techniques described herein improve a user experience when the user is navigating through content, such as user-generated content in an electronic document. For example, the techniques described herein semantically abstract authored content in an electronic document to provide abstracted content. In implementations, abstracted content includes abstracted pages that each represent a different section of the authored content. When a user scans through an electronic document, rather than scanning page by page, techniques described herein instead navigate through displays of the abstracted pages. In addition, a hinge between different displays can be used as an input mechanism to control a speed of navigating through the abstracted pages to allow a user to more easily locate specific sections of the authored content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for navigational aids for a hinged device via semantic abstraction are described. Generally, techniques described herein provide semantic abstractions of content during a rifling operation that scans through the content. The semantic abstractions can be generated based on a variety of different information (e.g., metadata) associated with the content, the user, and/or other users that view or co-author the content. For example, these techniques interpret a meaning of the content and perform various types of analysis on a subject of the content. Further, through user manipulation of a physical hinge to provide input to the hinged device, a speed of the rifling operation can be controlled and a level of granularity of the abstractions altered.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
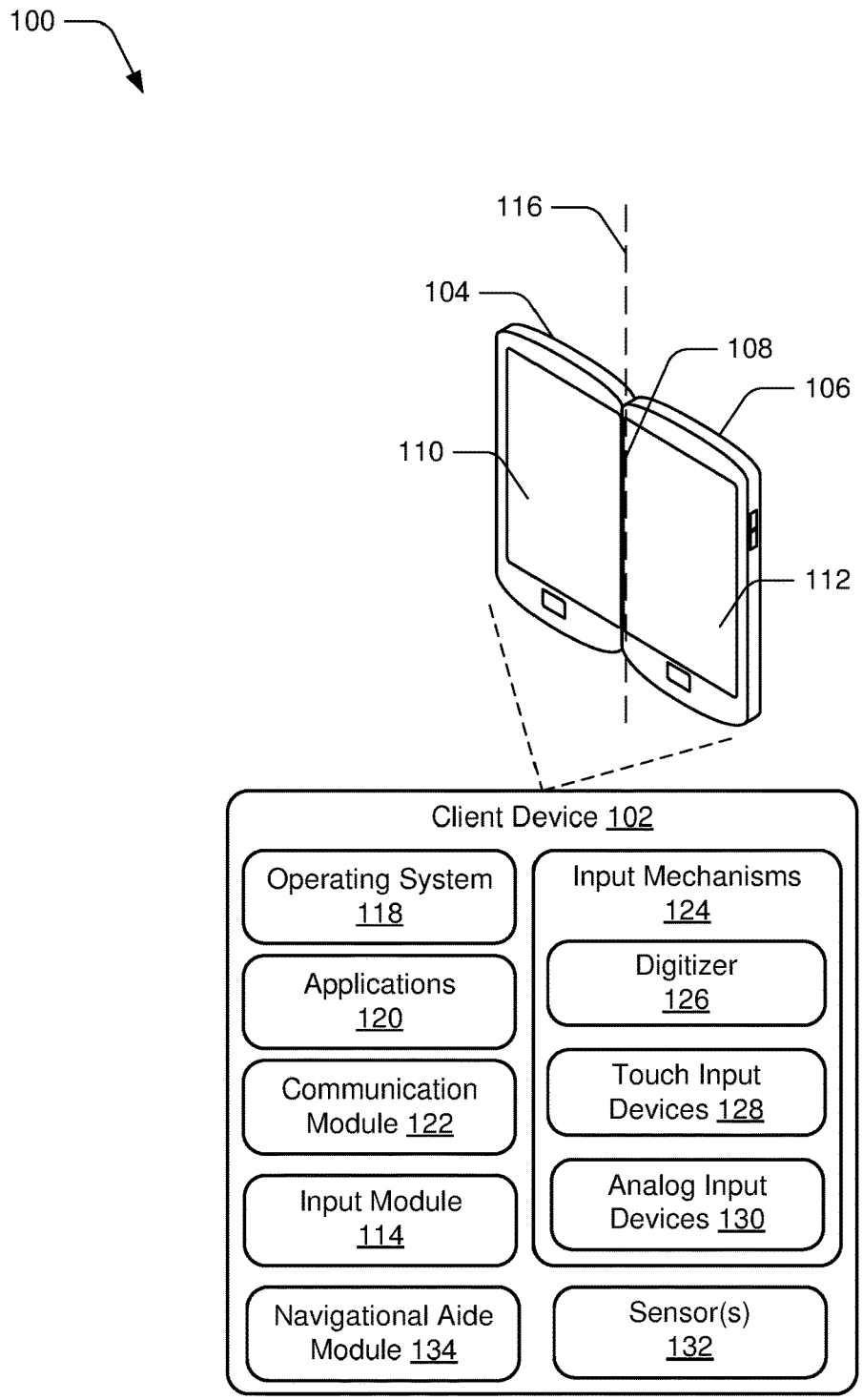
FIG. 1 is an illustration of an environment in an example implementation that is operable to employ the techniques described herein in accordance with one or more embodiments.

FIG. 1 is an illustration of an environment 100 in an example implementation that is operable to employ techniques for navigational aids for a hinge device via semantic abstraction discussed herein. Environment 100 includes a client device 102 which can be configured for mobile use, such as a mobile phone, a tablet computer, a wearable device, a handheld gaming device, a media player, and so on. The client device 102 includes a display device 104 and a display device 106 that are connected to one another by a hinge 108. The display device 104 includes a touch surface 110, and the display device 106 includes a touch surface 112. The client device 102 also includes an input module 114 configured to process input received via one of the touch surfaces 110, 112 and/or via the hinge 108.

The hinge 108 is configured to rotationally move about a longitudinal axis 116 of the hinge 108 to allow an angle between the display devices 104, 106 to change. In this way, the hinge 108 allows the display devices 104, 106 to be connected to one another yet be oriented at different angles and/or planar orientations relative to each other. In at least some implementations, the touch surfaces 110, 112 may represent different portions of a single integrated and continuous display surface that can be bent along the hinge 108.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 8.

The client device 102 includes a variety of different functionalities that enable various activities and tasks to be performed. For instance, the client device 102 includes an operating system 118, applications 120, and a communication module 122. Generally, the operating system 118 is representative of functionality for abstracting various system components of the client device 102, such as hardware, kernel-level modules and services, and so forth. The operating system 118, for instance, can abstract various components (e.g., hardware, software, and firmware) of the client device 102 to enable interaction between the components and applications running on the client device 102.

The applications 120 are representative of functionality for performing different tasks via the client device 102. In one particular implementation, the applications 120 represent a web browser, web platform, or other application that can be leveraged to browse websites over a network.

The communication module 122 is representative of functionality for enabling the client device 102 to communicate over wired and/or wireless connections. For instance, the communication module 122 represents hardware and logic for communicating data via a variety of different wired and/or wireless technologies and protocols.

According to various implementations, the display devices 104, 106 generally represent functionality for visual output for the client device 102. Additionally, the display devices 104, 106 represent functionality for receiving various types of input, such as touch input, stylus input, touchless proximity input, and so forth via one or more of the touch surfaces 110, 112, which can be used as visual output portions of the display devices 104, 106. The input module 114 is representative of functionality to enable the client device 102 to receive input (e.g., via input mechanisms 124) and to process and route the input in various ways.

The input mechanisms 124 generally represent different functionalities for receiving input to the client device 102, and include a digitizer 126, touch input devices 128, and analog input devices 130. Examples of the input mechanisms 124 include gesture-sensitive sensors and devices (e.g., such as touch-based sensors), a stylus, a touch pad, accelerometers, a microphone with accompanying voice recognition software, and so forth. The input mechanisms 124 may be separate or integral with the display devices 104, 106; integral examples include gesture-sensitive displays with integrated touch-sensitive sensors.

The digitizer 126 represents functionality for converting various types of input to the display devices 104, 106, the touch input devices 128, and the analog input devices 130 into digital data that can be used by the client device 102 in various ways. The analog input devices 130 represent hardware mechanisms (e.g., the hinge 108) that are usable to generate different physical quantities that represent data. For instance, the hinge 108 represents a mechanism that can be leveraged to generate input data by measurement of a physical variable, such as hinge angle of the hinge 108. One or more sensors 132, for example, can measure the hinge angle, and the digitizer 126 can convert such measurements into digital data usable by the client device 102 to perform operations to content displayed via the display devices 104, 106.

Generally, the sensors 132 represent functionality for detecting different input signals received by the client device 102. For example, the sensors 132 can include one or more hinge sensors configured to detect a hinge angle between the display devices 104, 106. Additionally, the sensors 132 can include grip sensors, such as touch sensors, configured to detect how a user is holding the client device 102. Accordingly, a variety of different sensors 132 can be implemented to detect various different types of digital and/or analog input. These and other aspects are discussed in further detail below.

In at least some implementations, the applications 120 include or otherwise make use of a navigational aid module 134. The navigational aid module 134, for example, represents a standalone application. In other implementations, the navigational aid module 134 is included as part of another application or system software, such as the operating system 118. Generally, the navigational aid module 134 is configured to semantically abstract content in an electronic document to provide abstracted content that is used when navigating through the document. Further, for user-generated content, the navigational aid module 134 is configured to interpret which words the user has used in the content and perform various types of analysis on a subject of the user's writing. The navigational aid module 134 can also utilize a variety of different types of information, such as metadata associated with content or a user, to abstract the meaning of the content and dynamically create temporary content (referred to herein as "abstracted content") that shows transient information during a rifling operation that scans through the document. Further discussion of this and other features is provided below.

Having described an example environment in which the techniques described herein may operate, consider now a discussion of some example implementation scenarios in accordance with one or more implementations.

Example Implementation Scenarios

This section describes some example implementation scenarios for navigational aids for a hinged device via semantic abstraction in accordance with one or more implementations. The implementation scenarios may be implemented in the environment 100 described above, the system 800 of FIG. 8, and/or any other suitable environment. The implementation scenarios and procedures, for example, describe example operations of the client device 102.

Figure 2:
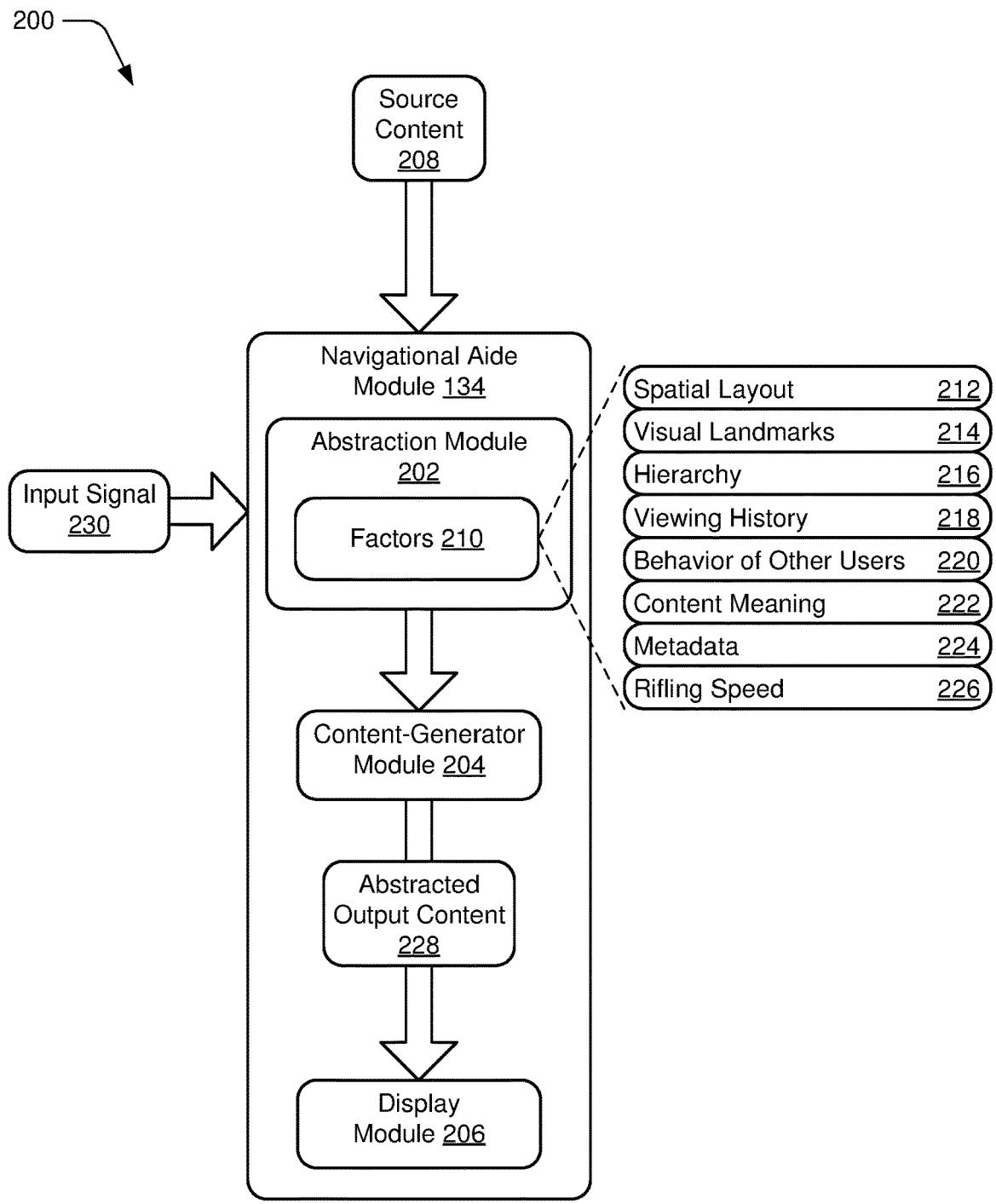
FIG. 2 depicts an example implementation of a navigational aid module from FIG. 1 in more detail.

FIG. 2 illustrates an example implementation 200 of the navigational aid module 134 from FIG. 1 in more detail. In the illustrated example, the navigational aid module 134 includes an abstraction module 202, a content generator module 204, and a display module 206. These modules can be implemented in hardware, software, firmware, or combination thereof. Further, although these modules are illustrated as being separate components, any of these modules can be combined into a single component to perform the functionalities described herein.

The abstraction module 202 is implemented at least partially in hardware of a computing device to analyze source content 208 (also referred to herein as "authored content"), such as user-generated content, and semantically abstract the source content 208 based on a variety of factors 210. Some example factors 210 include spatial layout 212, visual landmarks 214, hierarchy 216, viewing history 218, behavior of other users 220, content meaning 222, metadata 224, and rifling speed 226, each of which are described in more detail below.

The abstraction module 202 is configured to provide abstracted content to the content generator module 204, which is configured to generate abstracted output content 228 for display via the display module 206. As discussed further below, the abstracted output content 228 includes abstracted versions of the source content 208 that are used as reference points within the source content 208. Further, when an input signal 230 is received to initiate a rifling operation that scans through the source content 208, the abstracted output content 228 is displayed during the rifling operation rather than the source content 208 itself. In this way, the user can quickly scan through the abstracted output content 228 and get a sense of the subject matter of different sections of the source content 208 without having to sift page-by-page through the source content 208.

The input signal 230 can be detected from a variety of different input mechanisms, such as a touch input or a stylus input to the touch surface 110 or the touch surface 112 of the client device 102, a press of a hardware button, a bend in the hinge 108 of the client device 102, a voice command via an audio sensor, or any combination of input mechanisms. As discussed in more detail below, a user interaction with the hinge 108 can affect the rifling speed 226, which in turn can affect a degree of granularity associated with abstracting the source content 208 and/or a degree of abstraction relative to the source content 208. Accordingly, the input signal 230 can represent signals generated via a variety of different input mechanisms.

The spatial layout 212 may refer to relative locations of objects on pages of the source content 208. For instance, when a user creates content, the user may remember inserting a particular paragraph on the bottom right of a page, but may not remember an exact page number of that page. In another example, the user may remember inserting a diagram that spans two adjacent pages, similar to a magazine spread, but the user may not remember which pages include the diagram. In yet another example, a spread can include a greatest density of information on the right side rather than the left, or vice versa.

The spatial layout 212 information regarding the source content 208 is considered by the abstraction module 134 at least because the spatial information may be of interest to the user. For example, there may be a particular reason the user placed the diagram in that specific location. Accordingly, the spatial layout 212 can be used when creating abstracted output content 228 that is displayed when performing a rifling operation, in order to present information in the same or similar spatial location where it was originally authored. The abstracted output content 228 may include an abstracted view of a portion of the source content 208 in a particular location on the page, which can jog the user's memory that the section that is currently being rifled through is the section that has a particular spatial layout.

The visual landmarks 214 refer to objects that appear within the content that may be visually interesting to the user. The visual landmarks 214 can include a variety of different objects, such as headings, images, content clipped or linked from another source, multimedia (e.g., videos) embedded in a document, and so on. In an example, while creating an electronic journal, the user may capture an image with the user's camera and then add the captured image to the journal. In another example, the user may take notes via the touch surface of one display device (e.g., the display device 104), where the notes are contextual to an application displayed via the other display device (e.g., the display device 106). The user may, for instance, be planning a trip and use an open web browser on the display device 104 of the client device 102 to clip content, similar to scrapbooking in the physical world, and then add the clipped content to the journal displayed via the display device 106. In these examples, the visual landmarks 214 can be weighted relatively higher than mere text, such that they are more likely to be included in the abstracted output content 228, in comparison to the text. Similarly, if the user enters text in a particular color, such as an entire paragraph in red (e.g., a color that is different than other text in the source content 208), then the text may be considered a visual landmark based on a combination of the text being red and a certain bulk of content that was created. Alternatively or additionally, text color may be considered a visual landmark if the color is known to convey a certain meaning (e.g., importance) within the source content 208.

The hierarchy 216 factor may refer to content that is interpreted as a section boundary. For instance, if the user underlines text that appears to be a heading, then that text can be interpreted as indicating that the user is essentially naming that particular section of content. The underlined text may not explicitly be a chapter heading, but the underlining of the text may be considered a clue to how the content is being authored and organized. Other examples include bolding, highlighting, or circling an object or text. This type of information can be used as useful labels to represent a particular section of content and essentially jog the user's memory as to the subject matter of that particular section. Accordingly, to the extent that a hierarchy exists and/or is inferred, such as headings or bookmarks that the user has created, or objects that the user marked as a favorite using other features that exist within the system, this type of hierarchical information can be considered and essentially promoted to appear in the abstracted output content 228.

The viewing history 218 of the source content 208 may refer to a frequency at which the user viewed a particular section of the source content 208. For example, consider a user that returns to a particular section of content to edit or re-read that section or view a drawing that the user previously created. The viewing history 218 may indicate how frequently the user viewed the particular content, when the user most recently viewed the particular content, when the particular content was most recently edited, and so on. Accordingly, information that relates to content that was recently authored and/or more frequently interacted with can be prioritized when dynamically creating the abstracted output content 228. Information that was viewed recently can also be prioritized. Consequently, recently accessed content can be made easier to locate again by including such content in the abstracted output content 228.

The viewing history 218 can also indicate a duration of time that the user spent viewing a portion of the source content 208. In an example, if the user navigates to a particular page or set of sequential pages, the amount of time spent on that particular page or set of sequential pages can be tracked and used to infer that the content viewed is content that the user may wish to revisit again. In implementations, the viewing history 218 can also be combined with the metadata 224 described below to identify which sections the user tends to view at a particular time of day, when near a particular physical location or social setting, and so on. Such sections of the source content 208, for example, can be deemed important to the user at those particular periods of time or physical locations or settings.

Additionally, the viewing history 218 can indicate the user's behavior while scanning through pages of the source content 208, such as whether the user scans quickly through some sections of the source content 208 but slowly scans through other sections of the source content 208. This type of behavior can be used to infer that subject matter contained within the other sections that were slowly scanned may be of interest to the user and the user may be interested in revisiting those other sections. In this case, the prominence of those other sections can be increased as compared to the sections that were quickly scanned, and additional pages of the abstracted output content 228 can be created to abstractly represent the subject matter within those other slowly-scanned sections. Accordingly, the viewing history 218 can be used to identify sections of content that may be of more interest to the user.

The behavior of other users 220 may also be considered when abstracting the source content 208. In at least some scenarios, a user may create content that relates to other users. Some examples include notes taken at a meeting, notes from a brainstorming session where other people participated, a collaborative content creation project, and so on. Alternatively, the content may be solely authored by the user but other users are given access to view such content. In these and other scenarios, the user may wish to share his notes with the other people. The behavior of the other people when they access the content can be tracked to identify which portions of the content may have more interest to those other people, such as by how much time the other users spend viewing particular portions of the source content 208. Portions of the source content 208 that were recently edited by the other users can also be identified and used when abstracting the source content 208.

The content meaning 222 may refer to a concept representing words, phrases, or other objects in the source content 208. In an example, the abstraction module 202 is configured to analyze which words are written or entered, and index such information. If a word is repeated frequently in a section of the source content 208, then it is likely that that section relates to or is about a concept represented by the repeated word, which can be interpreted to be the content meaning 222 of that section. A search can be performed to locate and obtain a graphical representation of that concept. For example, consider a user that writes notes about cats. The content meaning 222 of the notes is determined to related to cats based on, for example, a number of instances of the word "cat" included in the notes, or a number of cat breeds mentioned in the notes. This information can be used to generate a page of the abstracted output content 228 that prominently features the word "cats". Alternatively or in addition, an image of a cat can be included in the page of the abstracted output content 228, even if the notes did not include any such image. The image may be included in the abstracted output content 228 if the image succinctly captures the essence of the subject matter and the content meaning 222 of that particular section of notes.

In an example, if the source content 208 includes images, audio, or video that is clipped or linked from a source over a network, then the source can be identified. In addition, the subject matter and corresponding content meaning 222 of the images, audio, or video can be determined using, for example, image recognition or similar techniques. Further, any notes or annotations corresponding to the images, audio, or video can be used to determine which portion of the images, audio, or video is likely important to the user. In an example, the user takes notes about football, and as part of the notetaking, the user inserts a video or a link to a video on YouTube™ into the notes. The video may span a variety of different subject matter, but may include a subset of subject matter relating to football. Then, it can be inferred that the portion of the video relating to football is the particular portion of the video that is of interest to the user, because it relates to the notes. Information from that particular portion of the video, such as a still frame, can then be used as a description shown on an associated page of the abstracted output content 228 to represent the content meaning 222 of the video.

Metadata 224 can also be used when abstracting the source content 208. Metadata 224 can include a variety of information associated with the user or the client device 102. For example, the metadata 224 can include times and dates at which the user authored the source content 208, people the user was with when the user authored the source content 208, a geographical location of the user when authoring the source content 208, and so on. In addition, the metadata 224 can correlate authored content with the user's schedule. For instance, from a combination of the user's calendar and social graph, it can be determined that the user was attending a particular conference, in a particular city or building, or with certain people, or any combination thereof. This information can be used to determine the meaning of any notes taken during that conference, while in that particular city or building, or while with those certain people. Often, a user's notes can be ambiguous or formed in cryptic shorthand known only to the user. The metadata 224 can thus be used to understand what the likely meaning of the notes is, even when the notes are not particularly clear on the surface.

The rifling speed 226 refers to a speed of rifling (e.g., scanning) through pages of the source content 208, and more particularly, through pages of the abstracted output content 228. The rifling speed 226 can also be used to help select between competing views of information. For example, if the user scans through the source content 208 slowly, such as at a rate below a threshold speed, then more granularity can be provided in the abstracted output content 228, e.g., more detailed information, because it is assumed that the user has more time to view more information.

If, however, the user begins scanning through the source content 208 more quickly, such as at a rate above a threshold speed, then it can be assumed that the user has less time to view the information. In this case, less granularity is provided in the abstracted output content 228 by further abstracting the source content 208. For example, assume the user has a page of notes about cats. The notes can be abstracted to a set of images of cats. As the rifling speed 226 increases, the set of images of cats can be further abstracted to a photo or an iconographic line drawing of a cat, or further abstracted from several cats to a single cat. Conversely, if the rifling speed decreases, then headings and/or other text can be included with the set of images of cats to provide additional information for the user to view. Accordingly, the granularity of the abstraction can be adjusted on the fly according to changes in the rifling speed 226.

Accordingly, the factors 210 can be used to identify subject matter to use when abstracting the source content 208. Further, the granularity of what is defined as the abstracted output content 228 can be controlled based on one or more of the factors 210, such as the viewing history 218 or the rifling speed 226. For instance, the abstraction module 202 is configured to abstract a single page or a single spread as a page of the abstracted output content 228, or abstract a range of pages having a similar topic as a single page of the abstracted output content 228. Abstracting a range of pages together as a single page of the abstracted output content 228 can facilitate efficient scanning of the content at a high rate of speed.

Figure 3:
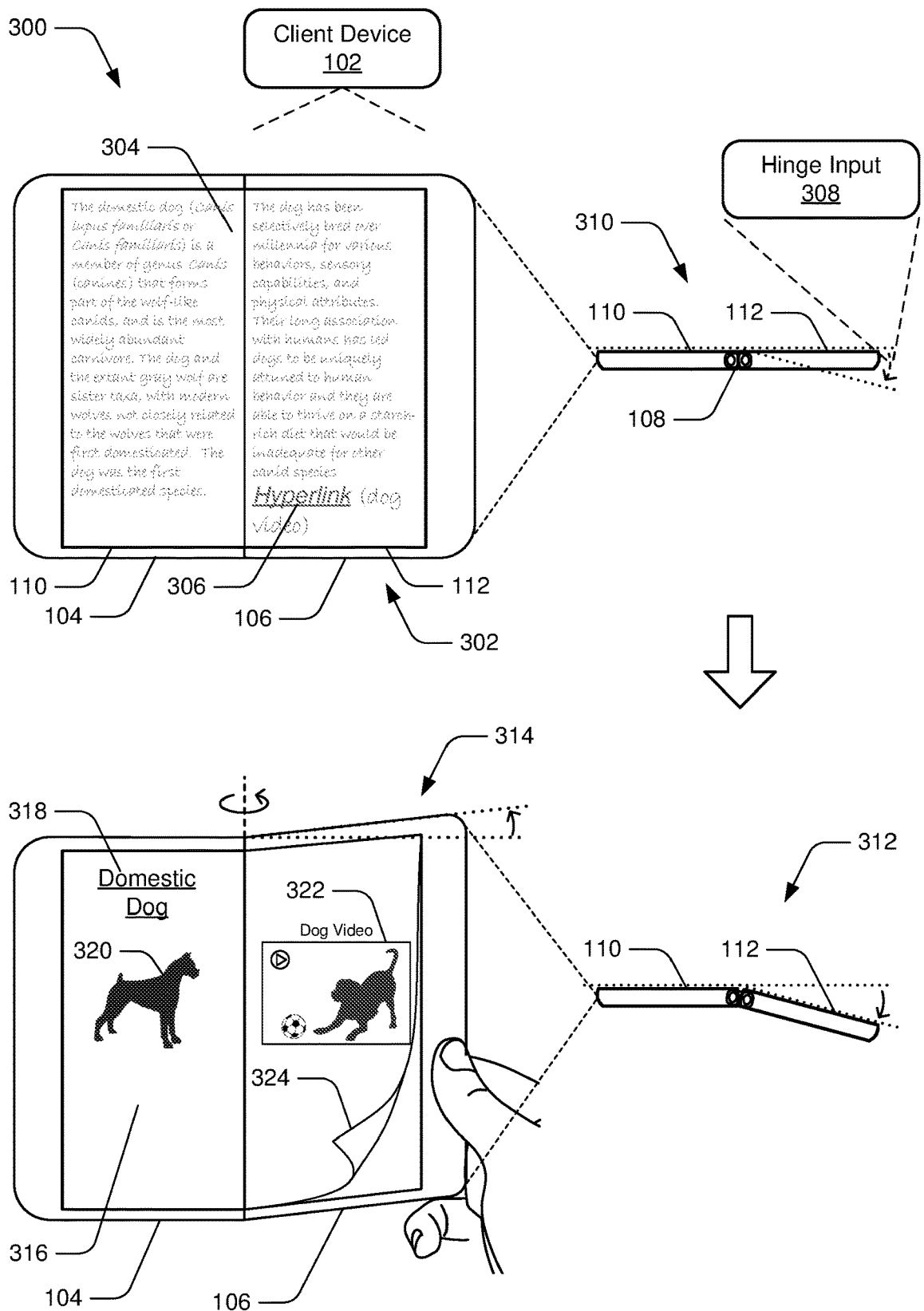
FIG. 3 depicts an example implementation scenario for navigational aids for a hinged device via semantic abstraction in accordance with one or more embodiments.

FIG. 3 illustrates an example implementation scenario 300 of a navigational aid for a hinged device via semantic abstraction. The scenario 300 represents a form of input that allows a user to interact with the client device 102 to scan through abstracted views of content. In the scenario 300, the client device 102 is being used in a standard state 302 to display a portion of a user's notes 304. The displayed portion of notes 304 includes notes about domestic dogs, via display device 104 and display device 106. The user has included in the notes 304 a hyperlink 306 that links to a video about a dog to correspond to the notes 304. The notes 304 displayed for viewing in this example scenario 300 are merely a portion of the user's notes, which may include sections pertaining to other subject matter, such as cats, cars, cowboys, houses, vacation, sailing, and so on. Accordingly, the notes 304 can include any subject matter entered by the user, and can include any number of pages.

In the scenario 300, the user initiates a rifling operation to scan through the notes 304 to locate a particular section of the notes 304. In at least one example, this is done via a hinge input 308 (e.g., bending the hinge 108), similar to bending a binding of a book with a thumb on a side of the book to rifle through the book's pages. For example, in the upper portion of the scenario 300, the client device 102 is initially in a flat state 310 in which both display devices 104, 106 are positioned side by side and face the same direction, i.e., are co-planar. The user then transitions the client device 102 from the flat state 310 to a bent state 312 by applying force to at least one of the display devices 104, 106 to cause the hinge 108 to bend, which further "opens" the client device 102, such that the touch surfaces 110, 112 are moved away from each other.

In the bent state 312, the display devices 104, 106 at least partially face opposite one another, such that the touch surfaces 110, 112 (also used at least partially as viewing surfaces of the display devices 104, 106) face away from each other. This particular hinge input 308 is described merely as an example and is not to be construed as limiting. For example, the hinge 108 can be bent in any direction to initiate the rifling operation. In another example, the client device 102 can initially be in a bent state such that a hinge angle between the display devices 104, 106 is less than 180 degrees, and the hinge input 308 can include manipulation of the hinge to further "open" the client device 102 toward an approximate flat state.

In at least one implementation, the rifling operation can be initiated via a combination of the hinge input 308 and another input signal, such as a touch input via a touch surface of one or both of the display devices 104, 106. For example, if the user touches a location on the right side of the display device 106 while moving the hinge 108, then the rifling operation can scan forward (e.g., to the right) through the notes 304. Conversely, if the user touches a location on the left side of display device 104 in conjunction with the hinge input 308, then the rifling operation can scan backward (e.g., to the left) through the notes 304.

Continuing with the scenario 300, rotational movement (e.g., bending) of the hinge 108 is detected by the sensors 130 and used as at least a portion of the input signal 230 to initiate or control the rifling operation. In response, the notes 304 are semantically abstracted to present abstracted views of the notes 304 to the user in a rifling state 314 and enable the user to quickly understand the subject matter of a particular section of the notes 304. For example, the portion of the notes 304 describing domestic dogs can be abstracted to an abstracted view 316 including a heading 318 titled "Domestic Dog". The abstracted view 316 can also include an image 320 of a dog, even though the portion of the notes 304 describing dogs did not include any such image 320.

In addition, the abstracted view 316 can include a still image 322 from the video linked via the hyperlink 306. In implementations, the still image 322 can be obtained from a portion of the video that corresponds to the concept of dogs. Here, for example, the still image 322 includes a dog playing with a ball, which corresponds to the subject matter of the notes 304. The abstracted view 316 can be displayed for any duration of time, e.g., 0.25 seconds, 0.5 seconds, 0.6 seconds, 0.75 seconds, 1.0 second, and so on. In operation, the abstracted view 316 may be displayed for a relatively longer period of time than a viewable page of a paper book when flipping through the paper book. Here, the abstracted view 316 is displayed for a time sufficient to allow the user to gain a sense as to the subject matter described in a particular section of the notes 304. Then, the display of the abstracted view 316 is changed, such as by flipping a digital page 324, to display an abstracted view of a next section of the notes 304.

As mentioned above, the user can control the speed of the rifling operation (e.g., the speed of flipping through the abstracted views) based on interactions with the hinge 108. For instance, the user may bend the hinge 108 further away from a reference position (e.g., flat state 310) to increase the speed of flipping through the abstracted views. Conversely, the user can move the hinge 108 to orient the client device 102 relatively closer to a reference position to decrease the speed of flipping through the abstracted views. In implementations, rotating the hinge 108 in a first direction can cause the rifling speed to increase while rotating the hinge 108 in a second direction (e.g., opposite the first direction) can cause the rifling speed to decrease.

The interaction with the hinge 108 can also cause the client device 102 to further abstract the associated content because the rifling speed 226 has increased, causing each abstracted view to be displayed for a relatively shorter period of time, giving the user less time to view and/or read the abstracted content. In contrast, if the user decreases the bend in the hinge 108 (e.g., manipulates the orientation of the client device 102 to be relatively closer to the flat state 310 or a reference position), then the rifling speed 226 decreases and the abstracted views can be modified to include additional details since each abstracted view is displayed for a relatively longer period of time and the user may have more time to view and/or read the abstracted content. Accordingly, based on user input (analog input via the hinge, touch input via touch surface 110 or 112, or other type of user input), the client device 102 determines a presentation time (e.g., 0.5 seconds, 1.0 seconds, 1.25 seconds, and so on) and a level of hierarchy of the abstracted views to present to the user while navigating through the content.

Figure 4:
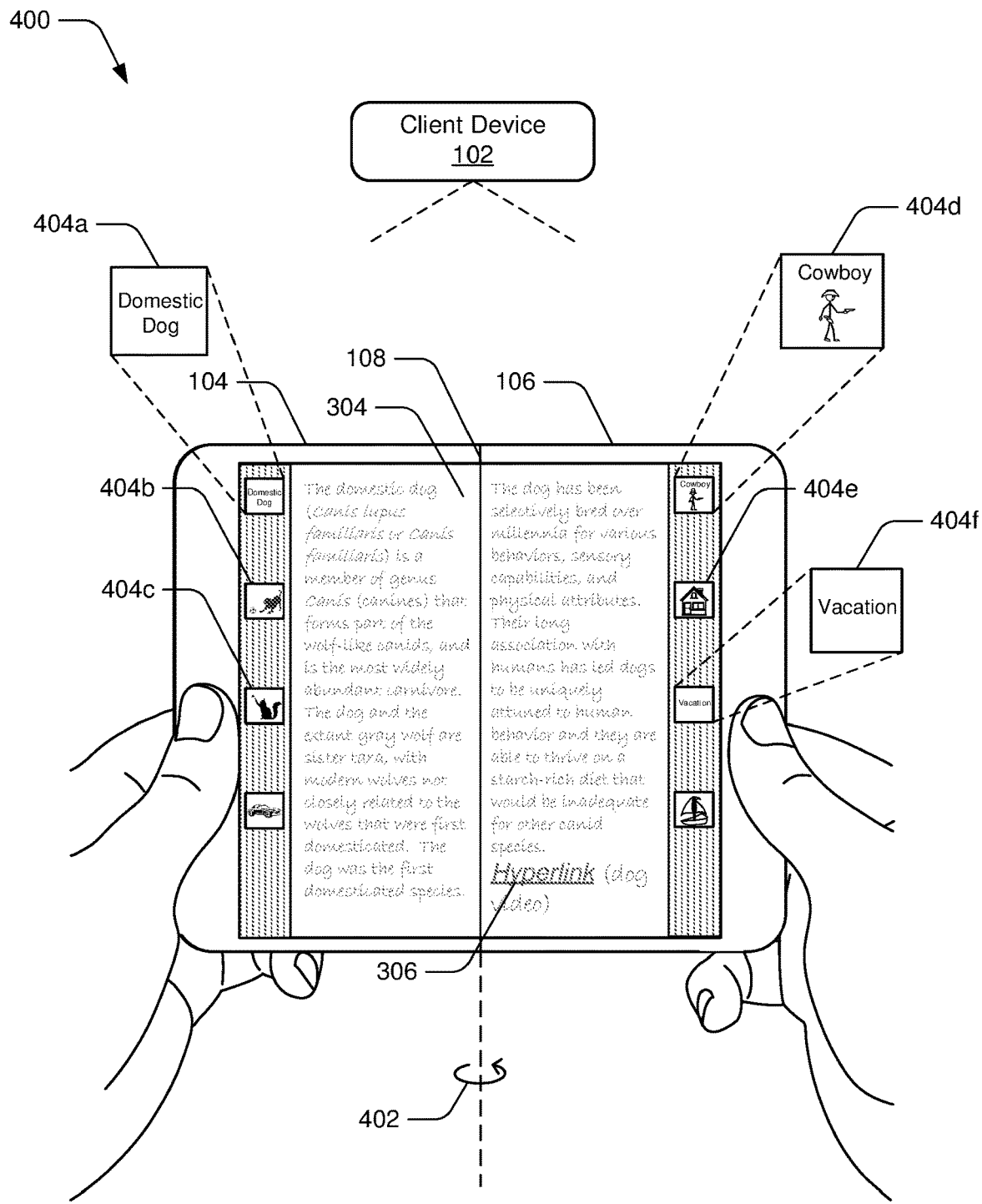
FIG. 4 depicts an example implementation scenario for an example user interface displaying navigational instrumentalities based on navigational aids for a hinged device via semantic abstraction in accordance with one or more embodiments.

FIG. 4 illustrates an example implementation scenario 400 for a user interface displaying navigational instrumentalities based on navigational aids for a hinged device via semantic abstraction. In the scenario 400, the user bends the hinge 108 as shown by arrow 402 to place the client device 102 in the bent state 312. In response, abstracted views 404 (404a, 404b, 404c, 404d, 404e, 404f) representing different sections of the notes 304 are displayed along an edge of one or more of the display devices 104, 106 without triggering a navigation away from currently displayed content.

In the illustrated example, the abstracted views 404 include a heading 404a "Domestic Dog" representing the section of notes describing domestic dogs, an image 404b of a dog playing with a ball to represent the video that is linked in the notes 304 via the hyperlink 306, and a cat 404c to represent a section of the notes describing cats. In addition, the scenario 400 includes an image 404d of a cowboy representing another section of notes describing cowboys, an image 404e of a house representing yet another section of the notes that references houses, and a heading 404f titled "Vacation" that represents a section of the notes that mentions vacation. The abstracted views 404 are generated based on the subject matter of the particular section of content that they represent, as described above. The abstracted views 404 can provide the user with a sense of relative location within a document or within the content. Rather than simply relying on a page number, the abstracted views 404 can give the user a sense of which subject matter is proximate to the right and left of currently displayed content.

While the abstracted views 404 are displayed, the abstracted views 404 can be used as navigational instrumentalities that, when selected, navigate to display a corresponding section of content. For example, if the user selects the image 404d of the cowboy, then the content displayed via display devices 104, 106 can jump to the section of notes describing cowboys. In essence, the abstracted views 404 act as an abstracted form of a table of contents for content that may not necessarily be organized into explicit sections.

In addition or alternatively, a table of contents can be automatically generated and added to the content, such as at or near a beginning of the content. Using the techniques described herein, the table of contents can be generated without explicit headings or section boundaries created by the user within the content. For example, using the factors 210 described with respect to FIG. 2, the abstracted output content 228 (e.g., abstracted views 404) is created in the form of a table of contents. In implementations, the table of contents can be generated based on an average level of abstraction. However, any suitable level of abstraction can be used to create the table of contents.

Having described some example implementation scenarios, consider now some example procedures for navigational aids for a hinged device via semantic abstraction in accordance with one or more implementations.

Example Procedures

The following discussion describes example procedures for navigational aids for a hinged device via semantic abstraction in accordance with one or more embodiments. The example procedures may be employed in the environment 100 of FIG. 1, the system 800 of FIG. 8, and/or any other suitable environment. The procedures, for instance, represent procedures for implementing the example implementation scenarios discussed above. In at least some implementations, the steps described for the various procedures can be implemented automatically and independent of user interaction, such as by the navigational aid module 134.

Figure 5:
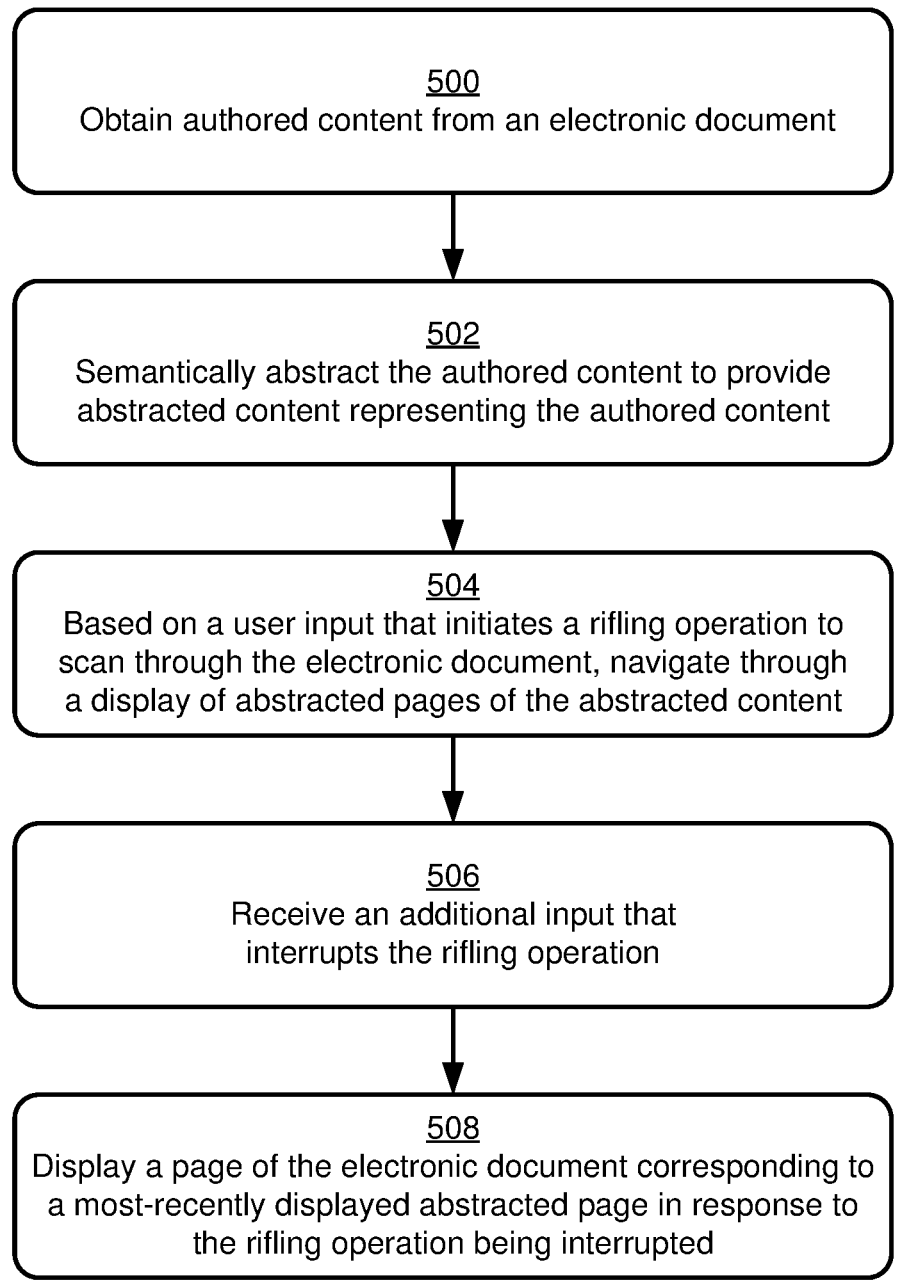
FIG. 5 is a flow diagram that describes steps in a method for providing navigational aids on a hinged device via semantic abstraction in accordance with one or more embodiments.

FIG. 5 is a flow diagram that describes steps in a method for providing navigational aids for a hinged device via semantic abstraction in accordance with one or more implementations. The method, for instance, describes an example procedure for generating abstracted views of content and scanning through the abstracted views.

Step 500 obtains authored content from an electronic document. The authored content can include a variety of different content, examples of which are described above. In at least one implementation, the authored content includes content created (e.g., authored) by a user of the client device 102.

Step 502 semantically abstracts the authored content to provide abstracted content representing the authored content. The authored content can be semantically abstracted in a variety of different ways, examples of which are described above. Additional factors can be used when abstracting the authored content to identify subject matter that may be of interest to the user. Example factors are described above in relation to implementation 200. In at least one example, the abstracted content is organized into abstracted pages, where each abstracted page represents a different section of the authored content. The abstracted pages are configured to be displayed during a rifling operation and are not added to the authored content of the electronic document. These abstracted pages are considered temporary pages and are modified based on a speed of the rifling operation, such as is described in relation to scenario 300.

Step 504 navigates through a display of the abstracted pages of the abstracted content based on a user input that initiates a rifling operation to scan through the electronic document. Rather than scanning page by page through the electronic document, the computing device 102 instead navigates through the abstracted pages of the abstracted content to allow the user to quickly and easily identify sections having particular information.

Step 506 receives an additional input that interrupts the rifling operation. In the scenario 300, for instance, the user can interact with the hinge 108 to transition an orientation of the client device 102 from the bent state 312 back to the flat state 310 or a reference position. The sensors 132 can detect movement of the hinge 108 that returns a hinge angle of the hinge 108 to an approximate previous position of the hinge angle prior to initiating the rifling operation.

Step 508 displays an authored page of the electronic document corresponding to a most-recently displayed abstracted page in response to the rifling operation being interrupted. For example, if the rifling operation is stopped while a particular abstracted page is displayed, then the particular abstracted page is removed from view and actual authored content of the electronic document is displayed that was represented by the particular abstracted page. In the scenario 300, for instance, if the domestic dog and the dog video were being displayed at a time when the rifling operation is ended, then the client device 102 displays the portion of the notes 304 corresponding to the domestic dog and the dog video.

Figure 6:
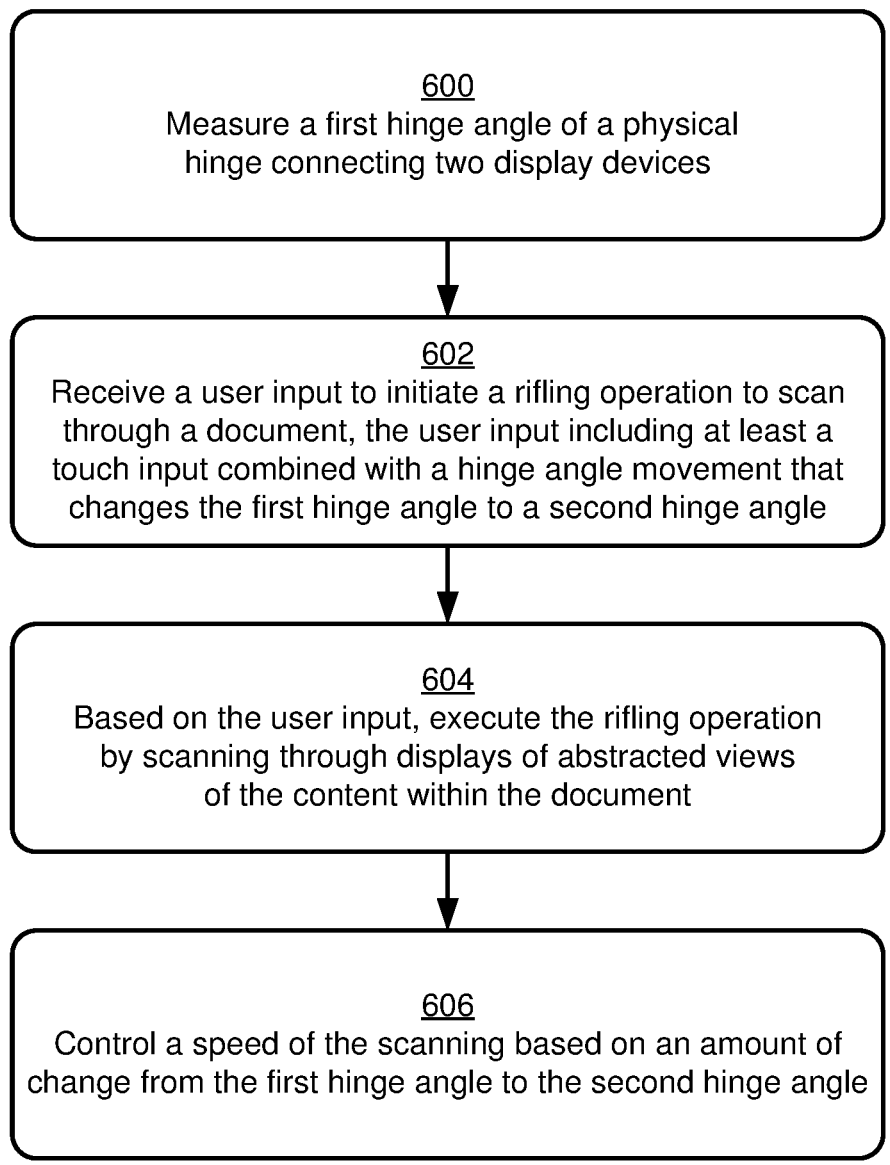
FIG. 6 is a flow diagram that describes steps in a method for controlling a scanning speed on a hinged device in accordance with one or more embodiments.

FIG. 6 is a flow diagram that describes steps in a method for controlling a scanning speed on a hinged device in accordance with one or more embodiments. The method, for instance, describes an example procedure for controlling a speed of a rifling operation that scans through abstracted views of content within a document.

Step 600 measures a first hinge angle of a hinge connecting two display devices. The client device 102, for example, uses sensors 132 to measure a current angle formed between the two display devices 104, 106 of the client device 102 that are physically connected by the hinge 108.

Step 602 receives a user input to initiate a rifling operation to scan through a document displayed via at least one of the two display devices. In at least some implementations, the user input includes a touch input combined with a hinge angle movement that changes the first hinge angle to a second hinge angle. Examples of this type of user input are described in relation to scenario 300.

Step 604 executes the rifling operation by scanning through displays of abstracted views of content within the document. In at least some implementations, the computing device 102 generates the abstracted views of the content and displays the abstracted views during the rifling operation rather than the content itself. Examples of scanning through the abstracted views are described in relation to scenario 300.

Step 606 controls a speed of the scanning based on an amount of change from the first hinge angle to a second hinge angle. Accordingly, based on how much the user bends the hinge, the speed of the scanning is controlled (e.g., set, increased, or decreased). Examples of controlling a speed of the scanning based on user interaction with the hinge are described in relation to implementation 200 and scenario 300.

Figure 7:
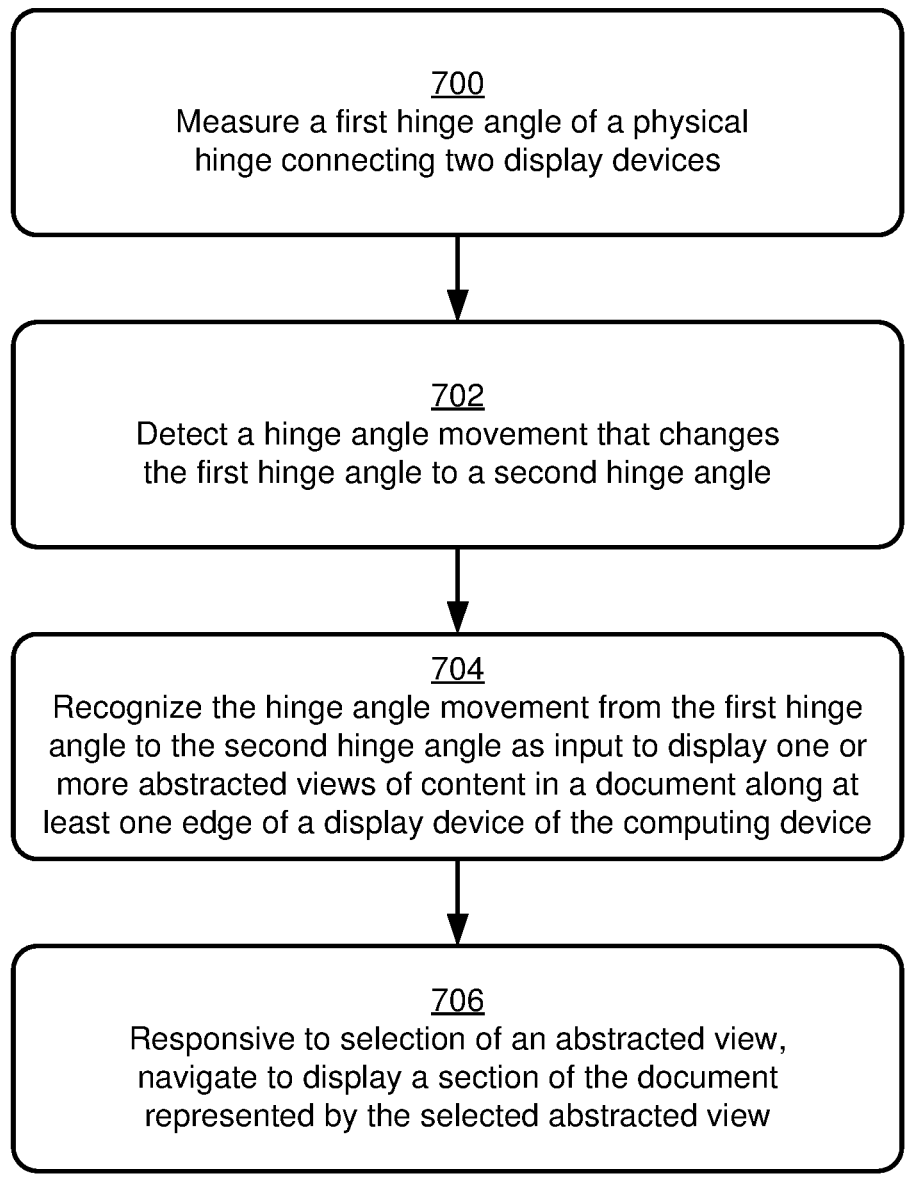
FIG. 7 is a flow diagram that describes steps in a method for providing navigational instrumentalities based on navigational aids on a hinged device via semantic abstraction in accordance with one or more embodiments.

FIG. 7 is a flow diagram that describes steps in a method for providing navigational instrumentalities based on navigational aids for a hinged device via semantic abstraction in accordance with one or more embodiments. The method, for instance, describes an example procedure for providing abstracted views of content within a document as navigational instrumentalities.

Step 700 measures a first hinge angle of a hinge connecting two display devices. The client device 102, for example, uses sensors 132 to measure a current angle formed between the two display devices 104, 106 of the client device 102 that are physically connected by the hinge 108.

Step 702 detects a hinge angle movement that changes the first hinge angle to a second hinge angle. In the environment 100, for example, the sensors 132 can detect movement of the hinge 108 and provide a corresponding signal to the input module 114 to convert the signal to an analog input corresponding to an operation to be executed. Additional examples of this type of user input are described in relation to scenario 300.

Step 704 recognizes the hinge angle movement from the first hinge angle to the second hinge angle as input to display one or more abstracted views of content in a document along at least one edge of one or more of the two display devices of the computing device. Examples of displaying abstracted views of the content along the edges of the display devices are described in relation to scenario 400.

Step 706 navigates, responsive to selection of an abstracted view of the one or more abstracted views, to display a section of the document represented by the selected abstracted view. Any of the abstracted views can be selected to navigate to display a corresponding section of the content in the document. This enables the user to quickly and easily jump to different sections of the document, particularly in a document that is not well organized, such as notes or a journal.

Having described some example procedures for navigational aids for a hinged device via semantic abstraction, consider now some further implementation details in accordance with one or more implementations.

Implementation Details

Generally, techniques for navigational aids for a hinged device via semantic abstraction described herein enable:
  Improved navigation through content, such as user-generated content, on a hinged device
  Control of rifling speeds based on interactions with a physical hinge that connects two or more portions of a mobile device
  Control of a level of granularity of abstraction of the content based on the rifling speed
  Automatic creation of abstracted views of content that are visible only when flipping through the content to allow the user to quickly recognize an approximate location of particular subject matter within the content
  Navigational instrumentalities representing the abstracted views to be revealed on edges of one or more display devices of the hinged device based on interactions with the physical hinge without triggering a navigation away from currently displayed content Accordingly, techniques described herein provide more efficient navigation through an electronic document, particularly for a content creation scenario. Additionally, the techniques described herein improve the user experience by allowing the user to easily understand abstracted concepts of different sections of the electronic document when scanning through the document. Further, the user can control how quickly the computing device scans through the electronic document by manipulating the physical hinge. The techniques described herein also provide different levels of granularity of abstraction based on the rifling speed and/or interactions with the physical hinge. In at least some implementations, different levels of granularity of abstraction can be computed prior to the rifling operation (e.g., pre-computed), such that a particular pre-computed level of granularity of abstraction is dynamically selectable based on the rifling speed. Accordingly, such implementations increase efficiency and reduce the time used to navigate by not requiring that different levels of abstraction be computed on demand, and thus preserve device resources (e.g., processor bandwidth, memory, and so forth) that would otherwise be used to navigate through unabstracted content.

Having described some example implementation details, consider now a discussion of an example system and device in accordance with one or more implementations.

Example System and Device

Figure 8:
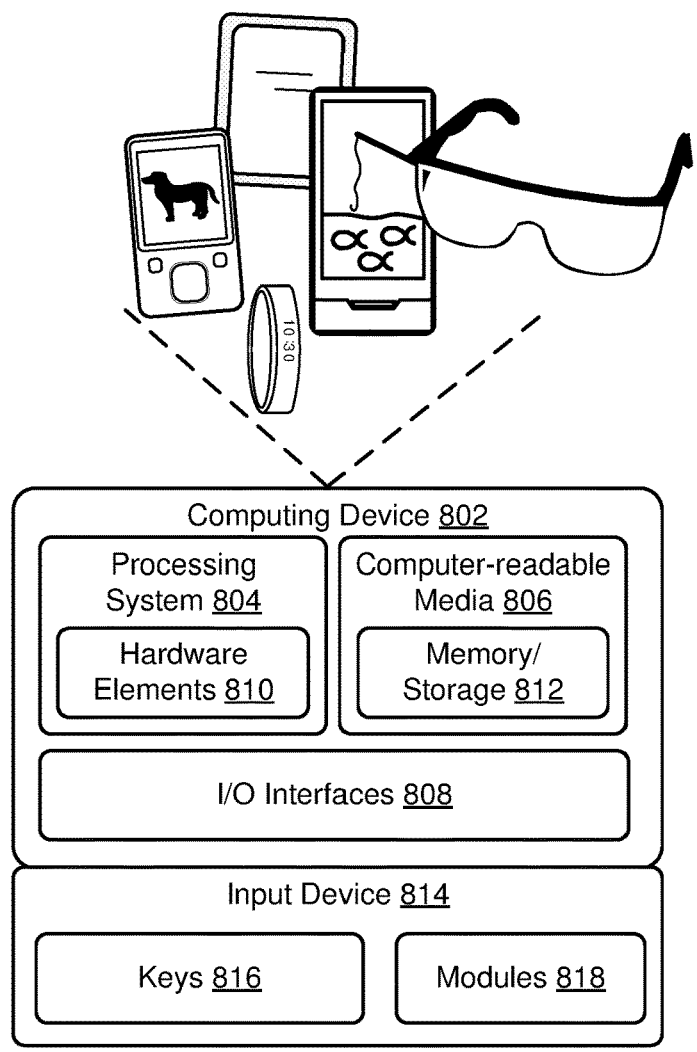
FIG. 8 illustrates an example system including various components of an example device that can be implemented as any type of computing device as described with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. In at least some implementations, the computing device 802 represents an implementation of the client device 102 discussed above. The computing device 802 may, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, a dual-surface gesture-input peripheral for a computing device, and so forth.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways to support user interaction.

The computing device 802 is further illustrated as being communicatively and physically coupled to an input device 814 that is physically and communicatively removable from the computing device 802. In this way, a variety of different input devices may be coupled to the computing device 802 having a wide variety of configurations to support a wide variety of functionality. In this example, the input device 814 includes one or more keys 816, which may be configured as pressure sensitive keys, mechanically switched keys, and so forth.

The input device 814 is further illustrated as include one or more modules 818 that may be configured to support a variety of functionality. The one or more modules 818, for instance, may be configured to process analog and/or digital signals received from the keys 816 to determine whether a keystroke was intended, determine whether an input is indicative of resting pressure, support authentication of the input device 814 for operation with the computing device 802, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media and does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A computing device configured to display abstracted views of content in an electronic document based on navigating through pages of the electronic document, the computing device comprising: at least one processor; and at least one computer-readable storage media storing instructions that are executable by the at least one processor to: obtain authored content from an electronic document; semantically abstract the authored content to provide abstracted content representing the authored content, the abstracted content including a plurality of abstracted pages each representing a different section of the authored content; and navigate through a display of the plurality of abstracted pages of the abstracted content based on a user input that initiates a rifling operation to scan through the electronic document.

In addition to any of the above described devices, any one or combination of: wherein the plurality of abstracted pages are not added to the authored content of the electronic document, and wherein one or more abstracted pages of the plurality of abstracted pages are displayed during the rifling operation; the device further comprising a first display portion and a second display portion physically connected to each other by a hinge, wherein the user input that initiates the rifling operation includes a change to a hinge angle of the hinge between the first display portion and the second display portion; wherein the instructions are further executable by the at least one processor to set a speed of navigating through the plurality of abstracted pages based on input associated with movement of the hinge; the device further comprising a first display portion and a second display portion physically connected to each other by a hinge, wherein the instructions are further executable by the at least one processor to change a speed of navigating through the plurality of abstracted pages based on a change to a hinge angle of the hinge between the first display portion and the second display portion; wherein one of the plurality of abstracted pages represents a set of authored pages from the electronic document; the device further comprising a first display portion and a second display portion physically connected to each other by a hinge, wherein the user input includes a touch input to at least one of the first display portion or the second display portion in combination with a change to a hinge angle of the hinge between the first display portion and the second display portion; wherein the instructions are further executable by the at least one processor to automatically create a table of contents based on a level of abstraction of the abstracted content; the device further comprising a first display portion and a second display portion physically connected to each other by a hinge, wherein the instructions are further executable by the at least one processor to, based on a change to a hinge angle of the hinge between the first display portion and the second display portion, display visual representations of the plurality of abstracted pages, wherein the visual representations are displayed proximate to an edge of at least one of the first display portion and the second display portion; the device further comprising a first display portion and a second display portion physically connected to each other by a hinge, wherein the instructions are further executable by the at least one processor to, based on a change to a hinge angle of the hinge between the first display portion and the second display portion, display visual representations of the plurality of abstracted pages, wherein the visual representations are enabled as selectable navigation instrumentalities to navigate to an authored page of the electronic document that corresponds to the selected visual representation; wherein the plurality of abstracted pages are generated based on at least one of a spatial layout of the authored content, one or more visual landmarks in the authored content, a hierarchy of sections of the authored content, or a viewing history of the authored content by a user; and wherein the plurality of abstracted pages are generated based on at least one of a behavior of at least one other viewer of the authored content, metadata associated with the authored content, or a rifling speed of the rifling operation.

A method implemented in a computing device for displaying abstracted views of content in an electronic document based on navigating through pages of the electronic document, the method comprising: obtaining content from an electronic document; semantically abstracting the content to provide abstracted views representing the content; receiving an input signal that initiates a scan through pages of the electronic document; and responsive to receiving the input signal, navigating through a display of one or more of the abstracted views that represent the content.

In addition to any of the above described methods, any one or combination of: the method further comprising measuring a first angle of a hinge connecting two display portions of the computing device, detecting a hinge angle movement that changes the first hinge angle to a second hinge angle, receiving a touch input via a touch surface of one of the two display portions, and recognizing a combination of the touch input and the hinge angle movement as the input signal to initiate the navigating through the display of the one or more of the abstracted views; and the method further comprising controlling a speed of the scanning based on an amount of change from the first hinge angle to the second hinge angle.

A method for displaying abstracted views of content based on a change in a hinge angle of connected display devices, the method comprising: measuring a first angle of a hinge physically connecting two display devices, the first angle being measured relative to the two display devices; detecting a hinge angle movement that changes the first hinge angle to a second hinge angle; recognizing the hinge angle movement from the first hinge angle to the second hinge angle as input to display abstracted views representing different sections of content in an electronic document; and displaying the abstracted views based on the input.

In addition to any of the above described methods, any one or combination of: wherein displaying the abstracted views includes displaying the abstracted views along an edge of at least one said display portion of the computing device; the method further comprising semantically abstracting the content in the electronic document to provide the abstracted views of the content for display, receiving a touch input to a touch surface of one of the two display devices, and recognizing a combination of the hinge angle movement and the touch input as an input signal to navigate through a display of the abstracted views; the method further comprising controlling a speed of navigating through the abstracted views based on an amount of change from the first hinge angle to the second hinge angle; and wherein displaying the abstracted views includes displaying at least one abstracted view along an edge of at least one said display portion of the computing device, wherein the at least one abstracted view is selectable to navigate to a display of a section of the content that corresponds to the at least one abstracted view.

CONCLUSION

Techniques for navigational aids for a hinged device via semantic abstraction are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A method comprising:
    analyzing source content of an electronic document to identify a section of the electronic document that is being accessed and a plurality of abstracted content portions for the section;
    receiving a user input that comprises an interaction with a hinge of a computing device;
    in response to the receiving of the user input, executing a rifling operation that automatically scans through one or more of the plurality of abstracted content portions of the section of the electronic document based on the interaction with the hinge; and
    updating, on a display associated with the computing device, a presentation of the electronic document to display a content portion of the electronic document based on a result of the executing of the rifling operation.

2. The method of claim 1, wherein the user input is a change to a hinge angle of the hinge associated with the computing device.

3. The method of claim 2, wherein the user input dictates a speed of the rifling operation based on an amount of change detected for the hinge angle.

4. The method of claim 1, further comprising: receiving a second user input that interrupts the rifling operation; and wherein the updating of the presentation stops a scan of the electronic document at a specific point in the source content based on the second user input that interrupts the rifling operation.

5. The method of claim 1, wherein the user input comprises two or more movements of the hinge of the computing device, and wherein a predetermined number of content portions of the electronic document are rifled through based on a receipt of the two or more movements of the hinge.

6. The method of claim 1, wherein the analyzing of the source content of the electronic document further comprises identifying a plurality of sections of the electronic document and abstracted content portions for each of the plurality of sections, and wherein the executing of the rifling operations scans through the plurality of abstracted content portions of the section to reach a second section of the electronic document.

7. The method of claim 1, wherein the user input comprises a touch input that occurs concurrent with the interaction with the hinge.

8. A system comprising:
    at least one processor; and
    a memory, operatively connected with the at least one processor, storing computer-executable instructions that, when executed by the at least one processor, causes the at least one processor to execute a method that comprises:
        analyzing source content of an electronic document to identify a section of the electronic document that is being accessed and a plurality of abstracted content portions for the section;
        receiving a user input that comprises an interaction with a hinge of the system;
        in response to the receiving of the user input, executing a rifling operation that automatically scans through one or more of the plurality of abstracted content portions of the section of the electronic document based on the interaction with the hinge; and
        updating, on a display associated with the system, a presentation of the electronic document to display a content portion of the electronic document based on a result of the executing of the rifling operation.

9. The system of claim 8, wherein the user input is a change to a hinge angle of the hinge associated with the system.

10. The system of claim 9, wherein the user input dictates a speed of the rifling operation based on an amount of change detected for the hinge angle.

11. The system of claim 8, wherein the content comprises a plurality of pages, and wherein the rifling operation rifles through two or more of the plurality of pages based on the executed rifling operation.

12. The system of claim 8, wherein the method, executed by the at least one processor, further comprises: receiving a second user input that interrupts the rifling operation; and wherein the updating of the presentation stops a scan of the electronic document at a specific point in the source content based on the second user input that interrupts the rifling operation.

13. The system of claim 8, wherein the user input comprises two or more movements of the hinge, and wherein a predetermined number of content portions of the electronic document are rifled through based on a receipt of the two or more movements of the hinge.

14. The system of claim 8, wherein the analyzing of the source content of the electronic document further comprises identifying a plurality of sections of the electronic document and abstracted content portions for each of the plurality of sections, and wherein the executing of the rifling operations scans through the plurality of abstracted content portions of the section to reach a second section of the electronic document.

15. A method comprising:
analyzing source content of an electronic document to identify a section of the electronic document that is being accessed and a plurality of abstracted content portions for the section;
receiving a user input that comprises an adjustment of a hinge of a computing device;
in response to the receiving of the user input, executing a rifling operation that automatically scans through one or more of the plurality of abstracted content portions of the section of the electronic document based on the adjustment of the hinge; and
updating, on a display associated with the computing device, a presentation of the electronic document to display a content portion of the electronic document based on a result of the executing of the rifling operation.

16. The method of claim 15, wherein the user input is a change to a hinge angle of the hinge associated with the computing device.

17. The method of claim 15, wherein the user input dictates a speed of the rifling operation based on an amount of change detected for the hinge angle.

18. The method of claim 15, wherein the executed method further comprising: receiving a second user input that interrupts the rifling operation; and wherein the updating of the presentation stops a scan of the electronic document at a specific point in the source content based on the second user input that interrupts the rifling operation.

19. The method of claim 15, wherein the user input comprises two or more movements of the hinge of the computing device, and wherein a predetermined number of content portions of the electronic document are rifled through based on a receipt of the two or more movements of the hinge.

20. The method of claim 15, wherein the analyzing of the source content of the electronic document further comprises identifying a plurality of sections of the electronic document and abstracted content portions for each of the plurality of sections, and wherein the executing of the rifling operations scans through the plurality of abstracted content portions of the section to reach a second section of the electronic document.

\* \* \* \* \*